2,744,894

HYDROXYALKYLATION OF POLYSACCHARIDES

Donald B. Benedict and Aubrey E. Broderick, South Charleston, W. Va., assignors to Union Carbide and Carbon Corporation, a corporation of New York No Drawing. Application September 8, 1952, Serial No. 308,522

9 Claims. (Cl. 260—231)

This invention relates to the production of hydroxyalkyl ethers of polysaccharides, and more especially it concerns a novel process for the production of water-soluble and/or alkali-soluble hydroxyalkyl ethers of cellulose and of starches under conditions whereby the polysaccharide material and the derivatives thereof are continuously maintained in substantially the same physical form as that of the original cellulose or starch throughout each stage of the process, and the final hydroxyalkyl ether of the cellulose or starch is readily purified from alkali metal salts, caustic alkali and organic by-products in a simple manner. For convenience, the following description is directed principally to the production of water-soluble hydroxyethyl celluloses.

For many years water-soluble hydroxyethyl celluloses have been made by reacting a cellulose with an aqueous solution of a caustic alkali to produce an alkali cellulose which is shredded and, after suitable aging for 24 hours or more, is etherified with 75% to 90% or more of ethylene oxide. In commercial practice the etherified product then is dissolved in water, filtered, and commonly dialyzed to remove caustic alkali, using a copious supply of water. Practical difficulties in filtering and dialyzing the viscous solutions of these high molecular weight cellulose ethers seriously limit the molecular weights of the cellulose ethers that can be successfully processed in this manner. Residual caustic alkali in the aqueous solutions of the cellulose ether is neutralized with a suitable acid, and the resultant product is marketed in solution form, or it is spray dried. The high viscosity of high molecular weight hydroxyethyl ethers of cellulose places a limit upon the molecular weight of the ethers that can be effectively dialyzed and spray dried.

The invention has outstanding utility over prior processes in the preparation of both water-soluble and water-insoluble but alkali-soluble hydroxyalkyl polysaccharides. By its use these ethers containing only small amounts of ash-forming impurities can be produced directly in the dry state. This permits the storage of the products for an indefinite time in relatively inexpensive containers without appreciable deterioration. Heretofore, where the ether products were made at one location and used elsewhere, it has been necessary either to remove the caustic soda by some suitable treatment or to dissolve the product in water and ship a dilute solution thereof. In the latter case the time element between production and use becomes important because of the general loss in molecular weight of these products while dissolved in caustic soda.

Among the more important objects of this invention are the following: the elimination of the preparation of alkali cellulose as a separate step in the production of an hydroxyalkyl cellulose, and the concurrent preparation of the alkali cellulose and its hydroxyalkylation in the same equipment; the maintenance of the cellulose, the intermediate alkali cellulose and the hydroxyalkyl cellulose product in solid or fibrous form during each step of the process; the provision in novel manner for producing water-soluble hydroxyethyl celluloses and hydroxyethyl starches of very high molecular weights that are readily purified by treatment with solvents for the caustic alkali in which solvents the hydroxyethyl celluloses and hydroxyethyl starches are insoluble; the reduction in the amount of caustic alkali required for the production of water-soluble hydroxyethyl ethers of cellulose and of starches; and the production of hydroxyalkyl celluloses and hydroxyalkyl starches under conditions facilitating ready recovery of the alkylene glycol by-products concurrently produced.

These and other objects are attained in the practice of this invention by a process which comprises forming a dispersion or slurry of a polysaccharide, such as a reactive cellulose, e. g., cotton linters, alpha cellulose and chemically treated wood pulp, and the like, or a slurry of a reactive starch such as corn starch, dispersed in a mixture of organic liquids, at least one of which dissolves substantial amounts of a caustic alkali, and in which liquids the cellulose or starch and the hydroxyalkyl celluloses or hydroxyalkyl starches are insoluble. These organic liquids and their constant boiling mixtures with water are inert to the reactants and preferably have boiling points at least around 20° C. higher than that of methanol. Such liquid mixtures consist of from about 70% to about 95% of one or more liquids boiling above 65° C., and preferably above 85° C., selected from the class consisting of the benzenoid hydrocarbons, the alkanes, and the mono-keto and mono-ether derivatives of the alkanes, in admixture with about 5% to about 30% of a secondary or a primary aliphatic monohydric alcohol containing an alkoxy group having 1 to 4 carbon atoms therein, such as the alkoxyethanols, alkoxyisopropanols, and alkoxypropanols, e. g., the methoxy- and butoxyisopropanols, the butoxyethanols, and the ethoxypropanols, and mixtures of such alkoxyalkanols. The secondary alkoxyalkanols of this type are preferred because they do not tend to react with the alkylene oxides. The cellulose or starch in the slurry then is agitated and reacted for a short time, commonly around 1 to 2 hours, with a dilute aqueous solution of a strong alkali, preferably caustic soda of around 15% to 30% strength, at temperatures below 50° C., and desirably between 5° C. and 30° C. Then the slurry, after cooling if necessary to bring it to below room temperature, has added thereto between 10% and 105% or more of an alkylene oxide, based upon the dry weight of the polysaccharide starting material, while agitating the mixture. Alkylene oxides of the type

wherein R represents hydrogen, or the methyl or vinyl radical are particularly useful. The production of uniform water-soluble hydroxyethyl polysaccharides requires the use in the etherification of between 75% and 105% or more of ethylene oxide, based upon the dry weight of the polysaccharide starting material. The etherified slurry then is heated for periods up to 6 to 10 hours or more at temperatures within the range from around 10° C. to around 50° C., after which it is cooled to room temperature or below, and commonly to 10° C.–20° C. When the caustic alkali content of the slurry is low as in the case of starch, a temperature of 40° C. is preferable. When propylene oxide is used the temperature is preferably 40° C.–50° C. to speed the reaction.

The resultant reaction mixture is filtered, centrifuged or otherwise treated to isolate the liquid portion. The isolated solid products then are extracted with suitable solvents to remove caustic alkali. The liquid portion of the reaction mixture can be fractionally distilled to recover any unreacted alkylene oxide and glycol by-products present therein.

Preferably, before the addition of the caustic alkali solution and the alkylene oxide to the slurry of the alcoholic dispersant and the polysaccharide, the reaction vessel used is purged with nitrogen, and during the reaction a slight pressure of nitrogen is maintained on the slurry with continuous agitation thereof. This facilitates the production of water-soluble products of high molecular weights. The hydroxyethyl celluloses thus produced commonly have high average molecular weights such that 5% aqueous solutions thereof have viscosities at 20° C. of from 1,500 to 100,000 centipoises or more, as measured with Brookfield & Hoeppler viscosimeters. The hydroxyethyl starches produced generally have average molecular weights such that 5% aqueous solutions thereof have viscosities at 20° C. of between 10 and 500 centipoises.

The maintenance of the cellulose and successive derivatives thereof throughout the process in substantially the same physical form as the original polysaccharide facilitetes purification of the isolated solid hydroxyalkyl polysaccharide ether to any desired degree by extraction with suitable solvents. Although methanol is the best known organic solvent for caustic soda, it has such a swelling effect upon the water-soluble type of hydroxyethyl celluloses that extraction is rendered difficult. The extractants used, therefore, are mixtures of methanol with substantial amounts of non-swelling agents for the water-soluble hydroxyethyl polysaccharides, such as acetone and isopropanol. Water-soluble hydroxyethyl starches having high percentages of combined ethylene oxide require extractants relatively low in methanol content.

It is impracticable to remove the last traces of caustic alkali from the hydroxyalkyl polysaccharides by extraction with organic solvents. Hence, the solid residue from the extraction is neutralized by a mineral acid such as hydrochloric, sulfuric or phosphoric acid, or an organic acid, such as acetic, monochloroacetic, maleic or glycollic acid, or the equivalent, by adding the acid to a slurry of the hydroxyalkyl ether in the extraction mixture. The neutralized product then is dried in a current of air, commonly at 50° C.–60° C., or by vacuum drying.

In order to secure uniformly hydroxyalkylated products, the inert organic liquid diluent mixtures useful in the practice of the invention should hold or be capable of holding in solution at a temperature of 20° C.–25° C. a slight amount, e. g., around 0.01% to 0.4%, of caustic alkali, without dissolving other than such slight amounts thereof. This small amount of caustic alkali in the diluent mixture appears to be necessary to redistribute and level off the caustic alkali concentration throughout the slurry. Preferably, the diluent mixture should hold not more than around 0.13% to 0.2% of the caustic alkali, since otherwise a higher conversion of the alkylene oxide to glycols results.

The dispersant mixture should hold or be capable of holding a small amount, e. g., around 0.5% to 5% or more, of water in solution or dispersion while in contact with the aqueous caustic alkali phase of the slurry of reactants. The dispersant also must be such that the dispersant-water phase of the slurry is incapable of dissolving either the alkali cellulose, the alkali starch, or the hydroxyalkyl ether of the cellulose or of the starch as formed in the process. For best results the moisture content of the dispersant mixture should be such that the dispersant phase of the slurry does not extract substantial amounts of water from nor impart water to the aqueous caustic alkali phase in contact therewith during the etherification reaction.

Among the liquids forming the major portion of the non-solvent organic liquid mixture serving as slurrying and dispersing agents in accordance with this invention are toluene, and the benzenoid hydrocarbons boiling above toluene; heptane and the alkanes boiling above heptane; n-propyl ether, n-butyl ether, and the n-alkyl ethers boiling above n-butyl ether; and aliphatic ketones boiling above 85° C., such as methyl isopropyl ketone, methyl propyl ketone, methyl isobutyl ketone and diisopropyl ketone.

The alkoxyisopropanols useful in the mixture of slurrying agents of the invention have structures corresponding to the formula RO·CH$_2$CHOHCH$_3$, wherein R designates a methyl, ethyl, isopropyl or butyl radical. These liquid dispersing agents serve to impart to the mixture of dispersants the necessary low solvent capacity for the caustic alkalies. Also useful in the process but less efficiently are the primary alkoxyalkanols, such as the alkoxyethanols and the alkoxypropanols wherein the alkoxy group is a methoxy, ethoxy, isopropoxy, propoxy or butoxy group.

In the practice of the invention the weight ratio of the dry polysaccharide to the non-solvent mixture acting as slurrying agent can range from slightly above 1:1 to 1:15 or more, depending on the type of mixing equipment used and the size of the polysaccharide particles. When using caustic soda as the caustic alkali in the process, amounts thereof ranging from 20% to 50% based upon the weight of the dry cellulose, have, upon etherification with ethylene oxide, given good water-soluble hydroxyethyl celluloses, while only a few per cent thereof is required from the production of water-soluble hydroxyethyl starches by the process. In the production of alkali-soluble hydroxyalkyl celluloses by the process much smaller amounts of caustic soda can be used. When using caustic potash, around 35% thereof, based upon the cellulose, yielded an hydroxyethyl cellulose about 50% of which was water-soluble. The ratio of caustic alkali to water usually is such as to provide, in the slurry, solutions containing 10% to 30% of the alkali.

The amount of water present in the slurry subjected to etherification with the alkylene oxide may vary widely, commonly ranging between 10% and 300% or more, based upon the dry weight of the polysaccharide. The smaller amounts are preferred when etherifying the alkali-treated starches by the process.

Alkylene oxides are known to react with water, especially in the presence of a caustic alkali, to form glycols and polyglycols. The formation of these products in the present process has been minimized, in part by reducing the amount of caustic alkali to less than around 50%, based upon the dry weight of the cellulose, in part by lowering the water content of the slurry being reacted, and in part by preventing the temperature from rising above around 50° C. during the etherification reaction. The low solubility of caustic soda in the alcohol or other solvent dispersing medium is also believed to be an important contributing factor. However, this process has the important advantage over prior processes that any glycols produced are easily recoverable in a usable form not highly diluted with water. In prior processes, involving the purification of the water-soluble cellulose ethers by dialysis, the dilution of the glycols with water was so great that recovery of the glycols was not practicable.

The use as dispersants of the hereindescribed mixtures of certain hydrocarbons, ethers and/or ketones with certain alkoxyalkanols has the outstanding practical advantage that, after filtration of the reaction mixture and extraction of the hydroxyalkyl cellulose or starch with a practicable extractant such as a 60:40% by weight mixture of methanol and acetone, the components of the resultant extract readily can be separated and recovered by conventional fractional distillation procedures. When extracting hydroxyethyl celluloses low in hydroxyalkyl content and most hydroxypropyl celluloses, methanol alone can be used.

The invention is illustrated by the following examples wherein all parts and percentages are given in terms of weight unless otherwise indicated.

Example 1

To 95 parts of a flocked chemical wood pulp high in alpha cellulose, having a particle size no greater than 40 mesh, and containing 7.0% of water, was added with agitation a mixture of 458.4 parts of n-butyl ether and 178.6 parts of methoxyisopropanol. The slurry was cooled to 0° C., and the reaction vessel was purged with nitrogen and closed, and the subsequent reactions were conducted in an atmosphere of nitrogen. 125.6 parts of an approximately 22% aqueous solution of caustic soda were added dropwise over a period of 45 minutes, and agitation was continued for another 30 minutes at 0° C. Then 73.5 parts of ethylene oxide were added to the slurry during 3 minutes, after which the temperature of the mixture was raised to 30° C. in 30 minutes with agitation. After 4 hours at this temperature the mixture was heated at 35° C. while mixing for 7 hours, and then it was filtered. The filtrate contained no unreacted ethylene oxide. The filtered solid hydroxyethyl cellulose was extracted first with a 50:50 by volume mixture of methanol and acetone and then with a 60:40 by volume mixture of methanol and acetone. Residual traces of alkali in the hydroxyethyl cellulose were neutralized with glacial acetic acid, and the purified hydroxyethyl cellulose was dried at 50° C.–60° C. in air. The 122.6 parts of the dry product represented a yield of 76%, based upon the cellulose and upon the ethylene oxide. Around 99% of the hydroxyethyl cellulose was soluble in water at 20° C.–30° C. A filtered 2% aqueous solution thereof had a viscosity at 20° C. of 195 centipoises at a pH of 6.5.

Example 2

Following the procedure and using the reactants described in Example 1, with the exception that a mixture of 572.8 parts of toluene and 78.7 parts of methoxyisopropanol was used (in place of the mixture of n-butyl ether and methoxyisopropanol), and about 73.2 parts of ethylene oxide were used, 125 parts of a dried hydroxyethyl cellulose were recovered, 94.8% of which was soluble in water at 20° C.–30° C. A 2% filtered aqueous solution thereof had a viscosity at 20° C. of 647 centipoises, at a pH of 6.00. A small amount of ethylene oxide was recovered from the filtrate obtained by the filtration of the etherification reaction mixture.

Example 3

Following the procedure and using the reactants described in Example 1, with the exception that a mixture of 572.5 parts of methyl isobutyl ketone and 79.1 parts of methoxyisopropanol was used (in place of the n-butyl ether and methoxyisopropanol), and about 73.6 parts of ethylene oxide were used as etherifying agent, 127.36 parts of hydroxyethyl cellulose were secured, almost 96% of which was soluble in water at 20° C.–30° C. A 2% aqueous solution of the product had a viscosity at 20° C. of 391 centipoises at a pH of 5.1. A small amount of ethylene oxide was recovered from the filtrate obtained by the filtration of the etherification reaction mixture.

Example 4

Following the general procedure described in Example 1, a slurry formed by mixing 95 parts of a flocked chemical wood pulp high in alpha cellulose content, having a particle size no greater than 40 mesh and containing 8.2% of water, 180.9 parts of methoxyisopropanol and 458.8 parts of n-butyl ether, was cooled to 2° C. and the reaction vessel purged with nitrogen and closed. The subsequent reactions were conducted in an atmosphere of nitrogen. With agitation 125.8 parts of a 21.9% aqueous solution of caustic soda were added dropwise during 1 hour. After 2 hours further agitation 15.5 parts of ethylene oxide were added during 2 minutes. The temperature was brought to 30° C. and held for 4 hours, then brought to 35° C. and held for 16.5 hours, with agitation. The reaction mixture then was cooled, filtered, and the filter cake extracted with 91% isopropanol, and then with methanol. A slurry thereof in methanol was neutralized with acetic acid, filtered, and the filter cake reslurried in acetone, filtered and dried at 50° C.–60° C. in air. A yield of hydroxyethyl cellulose of 90.6% was secured, based upon the cellulose and ethylene oxide used. Only 9.4% of the hydroxyethyl cellulose was extractable with hot water. A homogeneous slurry of 10.6 parts of this product in 114.4 parts of a 7% aqueous solution of caustic soda was frozen solid. Upon thawing it with agitation, a solution was secured free from fibers and having a viscosity at 20° C. of 15,600 centipoises. A film precipitated from this solution by immersion in a 30% aqueous solution of NaHSO₄ at 25° C. was tough, flexible, and insoluble in water.

Example 5

Following the general procedure and using the reactants described in Example 4, with the exception that a mixture of 461 parts of n-butyl ether and 181 parts of butoxyethanol was used in place of the mixture of n-butyl ether and methoxy-isopropanol, and about 82 parts of ethylene oxide were used as etherifying agent, the reaction was conducted at 30° C. for 4 hours and then at 45° C. for 16 hours. The reaction mixture was cooled, filtered, and the cake washed with isopropanol. Caustic soda was removed by reslurrying the cake in a 50:50 by volume mixture of methanol and acetone, and filtering. Residual caustic soda was neutralized with glacial acetic acid before the last filtration. The cake then was slurried in acetone, filtered, and dried at 50° C.–60° C. in air. A yield of 68.4% was secured of a hydroxyethyl cellulose that was 96.8% soluble in water. A 2% filtered aqueous solution thereof had a viscosity at 20° C. of 87 centipoises at a pH of 6.4.

Example 6

Following the general procedure and using the reactants described in Example 4, with the exception that the slurry contained 180.6 parts of a 43:57 by weight mixture of 3-ethoxyisopropanol and 3-ethoxypropanol-1 (in place of methoxyisopropanol), and that about 106.6 parts of propylene oxide were used (instead of ethylene oxide), the reaction mixture was held at 40° C. for 4 hours and then at 41° C.–45° C. for 63 hours. It was then cooled, filtered, extracted with isopropanol, and the product reslurried in a 40:60 by volume mixture of methanol and acetone, and filtered. Finally the residual caustic soda was neutralized with glacial acetic acid, and the neutralized product extracted with acetone, filtered and dried in air at 50° C.–60° C. There were secured 134 parts of an hydroxypropyl cellulose having 4% of moisture and a 2% ash content. This is equivalent to a yield of 63%, based upon the cellulose and ethylene oxide used. The product was 92.3% soluble in water at 30° C.–40° C. A 2% aqueous solution thereof had a viscosity of 129 centipoises at 20° C. and a pH of 6.9.

Example 7

Following the general procdure and using the reactants described in Example 6 with the exception that 82 parts of ethylene oxide were used (instead of the 106.6 parts of propylene oxide), and the reaction was conducted at 30° C. for 4 hours and then at 35° C. for 15 hours, an hydroxyethyl cellulose was secured in amount corresponding to a yield of 74.5%, based upon the cellulose and ethylene oxide used. The product had an ash content of 0.47% (bone dry basis) and was soluble in water at 20° C.–30° C. to around 99.5%. The viscosities at 20° C. of 2% and 5% aqueous solutions thereof were 107 centipoises and 3,100 centipoises, respectively. The pH's of the two solutions were 6.4 and 6.2, respectively.

Propylene oxide and butadiene monoxide are especially useful in the process where the production is desired of hydroxyalkyl celluloses that are insoluble in water but are soluble in dilute alkalies, such as 7% aqueous solutions of caustic soda.

By substituting in the process for the cellulosic material a reactive starch, such as a commercially available powdered corn starch, hydroxyethyl starches are produced and recovered which, like the hydroxyethyl celluloses, are water-soluble or are water-insoluble but dilute-alkali soluble, depending upon the proportions of starch and ethylene oxide used and upon other factors herein disclosed.

Example 8

A slurry was prepared by mixing at room temperature 200 parts of powdered corn starch having 10% moisture, 410.8 parts of n-butyl ether and 160.3 parts 3-methoxy-isopropanol. Using substantially the same procedure described in Example 4, 33.4 parts of an approximately 22% aqueous solution of caustic soda and 145.6 parts of ethylene oxide were added to the slurry, and after adding the latter the reaction was conducted at 30° C. for 4 hours and then at 35° C. for 16 hours. The caked reaction product was broken up, cooled, filtered, and extracted with acetone several times. The residual caustic soda was neutralized with acetic acid in the last extraction, and the product then was dried in vacuum at 20° C.–30° C. A yield of 333.4 parts of hydroxyethyl starch containing 6.34% of moisture and 0.56% ash was secured. The product partially dissolved in cold water, but dissolved in 90° C. water to an extent of over 99%. Two per cent and 5% aqueous solutions thereof, filtered, had viscosities at 20° C. of 8 centipoises and 3,850 centipoises, and pH's of 5.8 and 5.9, respectively.

The hydroxyalkyl celluloses and starches made by the process of the invention have low ash contents and are useful for the production of coating and impregnating compositions, and in the production of films, sheets and other shaped articles. They also are useful as thickening agents and stabilizers for colloidal mixtures and for mixtures containing suspended pigments and other solid particles such as resins.

The invention is susceptible of modification within the scope of the appended claims.

We claim:

1. Process for producing an hydroxyalkyl ether of a polysaccharide, which comprises dispersing a polysaccharide selected from the class consisting of the celluloses and the starches in a liquid dispersant mixture comprising (1) a major portion of a liquid boiling above 85° C. and selected from the class consisting of the benzenoid hydrocarbons, the alkanes, and the monoether and the monoketone derivatives of the alkanes, and (2) a minor portion of an alkoxyalkanol having one to four carbon atoms in the alkoxy group and selected from the class consisting of the alkoxyethanols, the alkoxyisopropanols and the alkoxypropanols, in the present of water and a caustic alkali, and agitating the resultant dispersion with an alkylene oxide having two to four carbon atoms, at elevated temperatures no higher than around 50° C., while maintaining in the solid state the polysaccharide and the hydroxyalkyl ether derivative thereof thus produced.

2. Process for producing an hydroxyalkyl ether of a polysaccharide, which comprises dispersing a polysaccharide selected from the class consisting of the celluloses and the starches in a liquid dispersant mixture comprising (1) a major portion of a liquid boiling above 85° C. and selected from the class consisting of the benzenoid hydrocarbons, the alkanes, and the monoether and monoketone derivatives of the alkanes, and (2) a minor portion of an alkoxyisopropanol having from one to four carbon atoms in the alkoxy group, in the presence of water and a caustic alkali, and agitating the resultant dispersion with an alkylene oxide having two to four carbon atoms, at elevated temperatures no higher than around 50° C., while maintaining in the solid state the polysaccharide and the hydroxyalkyl ether derivative thereof thus produced.

3. Process as defined in claim 2, wherein the alkylene oxide is ethylene oxide.

4. Process as defined in claim 2, wherein the alkylene oxide is propylene oxide.

5. Process as defined in claim 2, wherein the dispersant mixture comprises toluene.

6. Process as defined in claim 2, wherein the dispersant mixture comprises n-butyl ether.

7. Process as defined in claim 2, wherein the dispersant mixture comprises methyl isobutyl ketone.

8. Process for producing water-soluble hydroxyethyl ethers of cellulose, which comprises dispersing a cellulose in a liquid dispersant mixture comprising (1) a major portion of a liquid boiling above 85° C. and selected from the class consisting of the benzenoid hydrocarbons, the alkanes and the monoether and monoketone derivatives of the alkanes, and (2) a minor portion of a 2-alkoxyisopropanol having from one to four carbon atoms in the alkoxy group, agitating the resultant dispersion in admixture with a caustic alkali and water in amounts sufficient to provide a 10% to 30% aqueous solution of the caustic alkali, thereafter introducing ethylene oxide in amount at least 75% by weight of the dry cellulose, heating the mixture for at least six hours at a temperature within the range from around 30° C. to around 50° C., and recovering from the reaction mixture the water-soluble hydroxyethyl cellulose present therein.

9. Process for producing water-soluble hydroxyethyl ethers of cellulose, which comprises dispersing a cellulose in a liquid dispersant mixture comprising (1) a major portion of a liquid boiling above 85° C. and selected from the class consisting of the benzenoid hydrocarbons, the alkanes, and the monoether and monoketone derivatives of the alkanes, and (2) a minor portion of an alkoxyethanol having from one to four carbon atoms in the alkoxy group, agitating the resultant dispersion in admixture with a caustic alkali and water in amounts sufficient to provide a 10% to 30% aqueous solution of the caustic alkali, thereafter introducing ethylene oxide in amount at least 75% by weight of the dry cellulose, heating the mixture for at least six hours at a temperature within the range from around 30° C. to around 50° C., and recovering from the reaction mixture the water-soluble hydroxyethyl cellulose present therein.

References Cited in the file of this patent

UNITED STATES PATENTS

| Number | Name | Date |
| --- | --- | --- |
| 2,096,681 | Lorand | Oct. 19, 1937 |
| 2,098,335 | Dreyfus | Nov. 9, 1937 |
| 2,181,264 | Dreyfus | Nov. 28, 1939 |
| 2,572,039 | Klug et al. | Oct. 23, 1951 |
| 2,671,779 | Gaver et al. | Mar. 9, 1954 |
| 2,682,535 | Broderick | June 29, 1954 |